(12) United States Patent
Ikarashi et al.

(10) Patent No.: US 12,492,290 B2
(45) Date of Patent: Dec. 9, 2025

(54) RECORDING PAPER AND METHOD FOR MANUFACTURING SAME

(71) Applicant: YUPO CORPORATION, Tokyo (JP)

(72) Inventors: Takuya Ikarashi, Ibaraki (JP); Yutaro Sugamata, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 1048 days.

(21) Appl. No.: 16/628,371

(22) PCT Filed: Jun. 28, 2018

(86) PCT No.: PCT/JP2018/024579
§ 371 (c)(1),
(2) Date: Jan. 3, 2020

(87) PCT Pub. No.: WO2019/013005
PCT Pub. Date: Jan. 17, 2019

(65) Prior Publication Data
US 2020/0181344 A1      Jun. 11, 2020

(30) Foreign Application Priority Data

Jul. 12, 2017   (JP) ................................ 2017-136039
Nov. 17, 2017  (JP) ................................ 2017-221688

(51) Int. Cl.
*C08J 7/04*     (2020.01)
*C08J 7/043*    (2020.01)
(Continued)

(52) U.S. Cl.
CPC ............ *C08J 7/043* (2020.01); *C08J 7/0427* (2020.01); *C08J 7/044* (2020.01); *G03G 7/0046* (2013.01);
(Continued)

(58) Field of Classification Search
CPC ...... C08J 7/0427; G03G 7/008; G03G 7/0046
(Continued)

(56) References Cited

U.S. PATENT DOCUMENTS 4,360,434 A * 11/1982 Kawaguchi ............ B01D 71/60
                                            210/500.33
5,382,610 A *  1/1995 Harada ................... A61L 15/60
                                            428/221
(Continued)

FOREIGN PATENT DOCUMENTS

JP      H10-287039 A    10/1998
JP      2000-033770 A    2/2000
(Continued)

OTHER PUBLICATIONS

Machine_English_translation_JP_2005125515_A; Inoue, M.; et al.; Composition for Ink Jet Receiving Layer and Recording Object Material Using the Same; May 19, 2005; EPO; whole document (Year: 2015).*
(Continued)

*Primary Examiner* — Tahseen Khan
(74) *Attorney, Agent, or Firm* — GREENBLUM & BERNSTEIN, P.L.C.

(57) ABSTRACT

Provided are a recording paper having not only excellent appearance and high adhesion between a substrate and a resin coating but also high adhesion, particularly, high water resistant adhesion to ink or toner in various printing systems and a method for producing the recording paper. The recording paper of the present invention includes: a substrate composed of a thermoplastic resin film; and a resin coating disposed on at least one side of the substrate, wherein the resin coating contains a resin that is a reaction product of a cationic water-soluble polymer and a silane coupling agent, a content of a silane coupling agent component is 15 to 35 mass % based on a cationic water-soluble polymer compo-
(Continued)

nent in the resin coating, and the resin coating is free from thermoplastic resin particles.

7 Claims, 2 Drawing Sheets

(51) Int. Cl.
    *C08J 7/044* (2020.01)
    *G03G 7/00* (2006.01)
(52) U.S. Cl.
    CPC .......... *G03G 7/008* (2013.01); *C08J 2323/12* (2013.01); *C08J 2433/14* (2013.01)
(58) Field of Classification Search
    USPC ....................................................... 428/336
    See application file for complete search history.

(56) References Cited

U.S. PATENT DOCUMENTS

| | | | | |
|---|---|---|---|---|
| 5,589,259 | A * | 12/1996 | Hosoi | B41M 5/52 428/207 |
| 6,861,111 | B1 * | 3/2005 | Hasegawa | B41M 5/52 428/32.3 |
| 9,529,287 | B2 | 12/2016 | Ikarashi et al. | |
| 2003/0134746 | A1 * | 7/2003 | Iwasaki | B41M 5/3375 503/216 |
| 2015/0370182 | A1 * | 12/2015 | Ikarashi | G03G 7/004 428/327 |

FOREIGN PATENT DOCUMENTS

| | | | |
|---|---|---|---|
| JP | 2000-062096 | A | 2/2000 |
| JP | 2001-10202 | | 1/2001 |
| JP | 2001-10209 | | 1/2001 |
| JP | 2002-113959 | | 4/2002 |
| JP | 2005125515 | A * | 5/2005 |
| JP | 2006-159770 | | 6/2006 |
| JP | 2008-36935 | | 2/2008 |
| WO | 2014/092142 | | 6/2014 |

OTHER PUBLICATIONS

International Search Report issued in International Patent Application No. PCT/JP2018/024579, dated Sep. 25, 2018, with English translation.
International Preliminary Report of Patentability issued in International Patent Application No. PCT/JP2018/024579, dated Jan. 14, 2020, with English translation.
JP Office Action, Japanese Patent Application No. 2019-529050, issued Sep. 24, 2020, English translation.
The Extended European Search Report, EPO, Application No. 18832743.1, issued Feb. 25, 2021.

* cited by examiner

[Fig. 1]
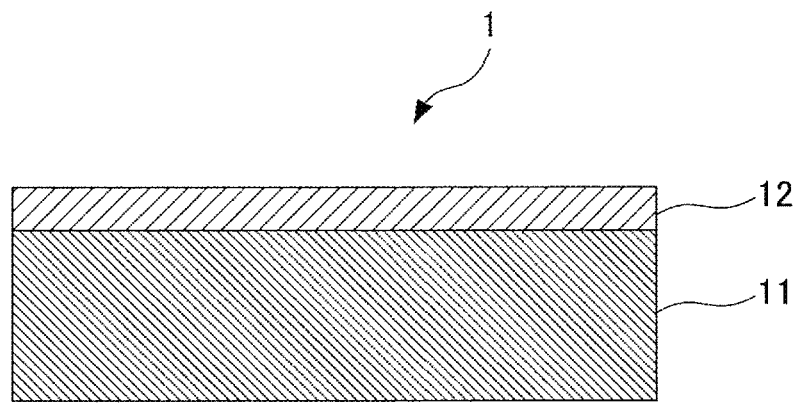
[Fig. 2]
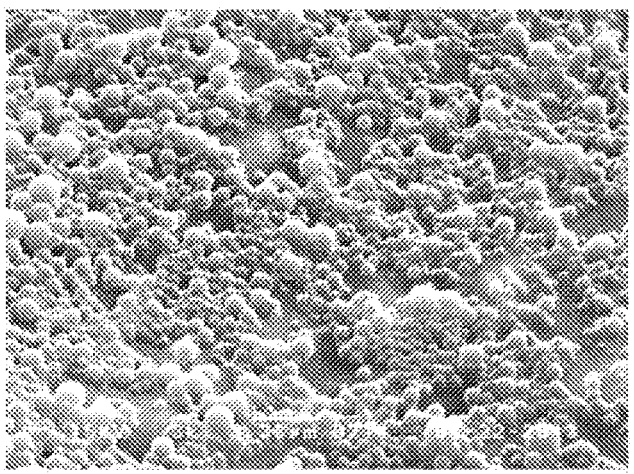
[Fig. 3]
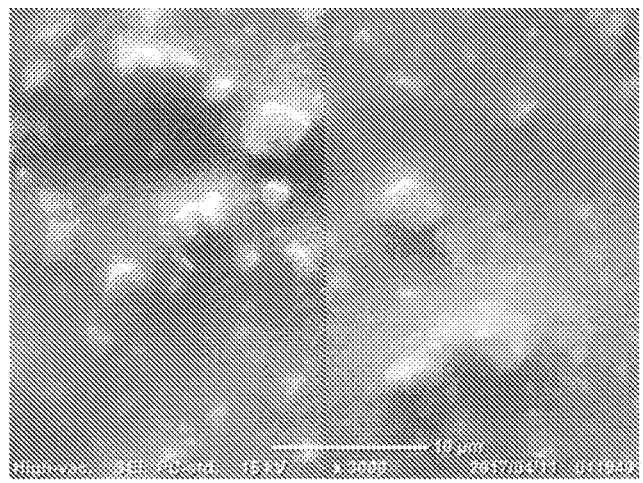

[Fig. 4]
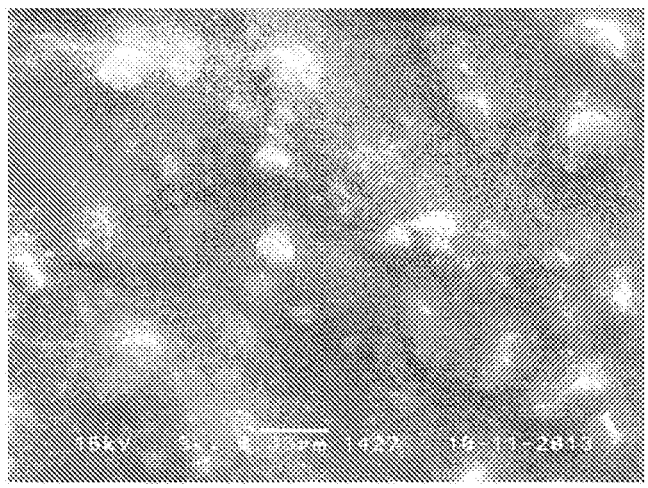

RECORDING PAPER AND METHOD FOR MANUFACTURING SAME

TECHNICAL FIELD

The present invention relates to recording paper and a method for producing the paper.

BACKGROUND ART

Conventionally, recording paper that is excellent in water resistance, weather resistance, and durability has been proposed as various recording paper such as printing paper, poster paper, label paper, ink jet recording paper, heat-sensitive recording paper, thermal transfer receiving paper, pressure-sensitive transfer recording paper, and electrophotographic recording paper. For example, a thermoplastic resin film which is excellent in ink transferability, adhesion, and water resistant adhesion under high temperature and high humidity and with which clear images are obtained has been proposed as recording paper suitable for heat transfer printing systems (for example, see Patent Literature 1).

As recording paper suitable for the wet electrophotographic printing system using liquid toner, which has become widespread in recent years, recording paper having a surface treatment layer formed by applying a coating solution containing an olefin copolymer emulsion onto a substrate, followed by drying, has been proposed (for example, see Patent Literature 2). In this recording paper, olefin copolymer particles derived from the emulsion within the surface treatment layer are softened by heating to fuse with the liquid toner, thereby enhancing the adhesion to the liquid toner and the substrate.

CITATION LIST

Patent Literature

Patent Literature 1: Japanese Patent Application Laid-Open No. 2002-113959
Patent Literature 2: International Publication No. 2014/092142

SUMMARY OF INVENTION

Technical Problem

However, as a result of studies by the inventors on such a resin coating formed using a coating solution containing an emulsion, it turned out that there is room for improvement in appearance such as uneven application caused by the olefin copolymer particles derived from the emulsion, surface gloss, and transparency. Further, it also turned out that there is room for further improvement in adhesion between the substrate and the resin coating, regardless of the type of thermoplastic resin used as the substrate of the recording paper.

It is an object of the present invention to provide recording paper having not only excellent appearance and high adhesion between a substrate and a resin coating but also high adhesion, particularly, high water resistant adhesion to ink or toner in various printing systems, and a method for producing the recording paper.

Solution to Problem

As a result of diligent studies in order to solve the above problems, the inventors have found that a resin coating can be formed using a resin that is a reaction product of a cationic water-soluble polymer and a silane coupling agent without containing olefin copolymer particles, and the aforementioned problems can be solved by the resin coating, thereby accomplishing the present invention.

That is, one aspect of the present invention provides
(1) recording paper comprising: a substrate composed of a thermoplastic resin film; and a resin coating disposed on at least one side of the substrate, wherein the resin coating comprises a resin that is a reaction product of a cationic water-soluble polymer and a silane coupling agent, a content of a silane coupling agent component is 15 to 35 mass % based on a cationic water-soluble polymer component in the resin coating, and the resin coating is free from thermoplastic resin particles.
(2) The cationic water-soluble polymer is preferably a (meth)acrylic polymer or an ethyleneimine polymer having an amino group or an ammonium salt structure.
(3) The (meth)acrylic polymer or the ethyleneimine polymer having an amino group or an ammonium salt structure preferably has a primary to tertiary amino group or a primary to tertiary ammonium salt structure.
(4) The silane coupling agent is preferably an epoxy silane coupling agent.
(5) The thermoplastic resin film is preferably a polyolefin resin film or a polyester resin film.
Further, another aspect of the present invention provides
(6) a method for producing a recording paper, comprising applying an aqueous solution containing a cationic water-soluble polymer and a silane coupling agent and being free from thermoplastic resin particles onto at least one side of a substrate composed of a thermoplastic resin film, followed by drying, to form a resin coating on the substrate.
(7) The content of a silane coupling agent component is preferably 15 to 35 mass % based on a cationic water-soluble polymer component in the resin coating.
(8) The cationic water-soluble polymer is preferably a (meth)acrylic polymer or an ethyleneimine polymer having an amino group or an ammonium salt structure.
(9) The (meth)acrylic polymer or the ethyleneimine polymer having an amino group or an ammonium salt structure preferably has a primary to tertiary amino group or a primary to tertiary ammonium salt structure.
(10) The silane coupling agent is preferably an epoxy silane coupling agent.
(11) The thermoplastic resin film is preferably a polyolefin resin film or a polyester resin film.

Advantageous Effects of Invention

The present invention can provide recording paper having not only excellent appearance and high adhesion between a substrate and a resin coating but also high adhesion, particularly, high water resistant adhesion to ink or toner in various printing systems and a method for producing the recording paper.

BRIEF DESCRIPTION OF DRAWINGS

FIG. 1 is a sectional view showing a structure of recording paper according to one embodiment of the present invention.
FIG. 2 is an image capturing a surface of a resin coating of recording paper according to Comparative Example 1.
FIG. 3 is an image capturing a surface of a resin coating of recording paper according to Example 1.

FIG. 4 is an image capturing a surface of a substrate used for the recording paper in Comparative Example 1 and Example 1.

DESCRIPTION OF EMBODIMENTS

Hereinafter, recording paper and a method for producing the recording paper of the present invention will be described in detail, but the configuration requirement described below is an example as one embodiment of the present invention (representative example) and is not specified by these contents.

In the following description, the term "(meth)acrylic" means both of acrylic and methacrylic.

(Recording Paper)

The recording paper of the present invention includes a substrate composed of a thermoplastic resin film, and a resin coating (which may be hereinafter referred to as "resin coating according to the present invention") disposed on at least one side of the substrate. The resin coating may be disposed on only one side or both sides as long as it is disposed on at least one side of the substrate.

FIG. 1 shows a configuration example of recording paper as one embodiment of the present invention.

As shown in FIG. 1, recording paper 1 includes a substrate 11 and a resin coating 12 disposed on one side of the substrate 11.

(Substrate)

In the present invention, the substrate is composed of a thermoplastic resin film. Use of a thermoplastic resin film as the substrate can impart mechanical strength such as stiffness, water resistance, chemical resistance, opacity, as required, to the recording paper or printings using the recording paper.

(Thermoplastic Resin)

The thermoplastic resin used for the thermoplastic resin film is not specifically limited, and examples thereof include polyolefin resins such as polypropylene resins, high-density polyethylene, medium-density polyethylene, linear low-density polyethylene, an ethylene-vinyl acetate copolymer, an ethylene-acrylic acid copolymer, an ethylene-methacrylic acid copolymer, a metal salt (ionomer) of an ethylene-methacrylic acid copolymer, an ethylene-alkyl acrylate copolymer, an ethylene-alkyl methacrylate copolymer (the alkyl group preferably has 1 to 8 carbon atoms), poly-4-methyl-1-pentene, and an ethylene-cyclic olefin copolymer; polyester resins such as polyethylene terephthalate, polybutylene terephthalate, polyethylene naphthalate, polybutylene succinate, and polylactic acid; polyamide resins such as nylon-6, nylon-6,6, nylon-6,10, and nylon-6,12; polystyrene resins such as syndiotactic polystyrene, atactic polystyrene, an acrylonitrile-styrene copolymer, and an acrylonitrile-butadiene-styrene copolymer; polyvinyl chloride resins, and polycarbonates. Two or more types of these resins can be mixed for use.

Among these, polyolefin resins or polyester resins are preferable because of their high water resistance and high transparency, and ease of formation of a resin coating, which will be described below. In view of film formability, polypropylene resins are further preferable among polyolefin resins, and polyethylene terephthalate is further preferable among polyester resins. The effects of the present invention are remarkable in the case of using polyolefin resins.

Examples of the polypropylene resins include polypropylene copolymers having various stereoregularities obtained by copolymerization of propylene as the main component with α-olefins or the like such as ethylene, 1-butene, 1-hexene, 1-heptene, 1-octene, and 4-methyl-1-pentene, in addition to isotactic homopolypropylene and syndiotactic homopolypropylene obtained by homopolymerization of propylene. The polypropylene copolymers may be a multi-component system of binary or ternary or more, a random copolymer, or a block copolymer.

(Filler)

The thermoplastic resin film can contain a filler for adjusting the rigidity, the whiteness, and the opacity of the substrate. Examples of the filler include inorganic fillers and organic fillers, and these fillers can be used individually or in combination. In the case where a thermoplastic resin film containing a filler is stretched, many micropores with the filler serving as a core can be formed inside the thermoplastic resin film, as a result of which whitening, opacification, and weight reduction can be achieved.

Examples of the inorganic fillers include heavy calcium carbonate, light calcium carbonate, fired clay, talc, diatomite, titanium oxide, zinc oxide, barium sulfate, silicon oxide, magnesium oxide, and inorganic particles obtained by surface-treating these with fatty acid, a polymer surfactant, an antistatic agent, and the like. Among these, heavy calcium carbonate, light calcium carbonate, fired clay, or talc is preferable because of their good formability of pores and low cost. For improving the whiteness and the opacity, titanium oxide, zinc oxide, or barium sulfate is preferable.

The organic fillers are not specifically limited but are preferably organic particles that are immiscible with the thermoplastic resin, have a melting point or a glass transition temperature higher than that of the thermoplastic resin, and are finely dispersed under the melt-kneading conditions of the thermoplastic resin. For example, in the case where the thermoplastic resin is a polyolefin resin, examples of the organic fillers include organic particles of polyethylene terephthalate, polybutylene terephthalate, polyethylene naphthalate, polystyrene, polyamide, polycarbonate, polyethylene sulfide, polyphenylene sulfide, polyimide, polyether ketone, polyetheretherketone, polymethylmethacrylate, poly-4-methyl-1-pentene, a homopolymer of a cyclic olefin, a copolymer of a cyclic olefin and ethylene, and the like. Further, fine powder of a thermosetting resin such as a melamine resin may also be used, and it is also preferable to insolubilize a thermoplastic resin by crosslinking.

The melting point (° C.) and the glass transition temperature (° C.) of the resin can be measured by differential scanning calorimetry (DSC).

One of the inorganic fillers and the organic fillers may be selected from above to be used singly, or two or more of them may be used in combination. In the case of combining two or more types, an inorganic filler and an organic filler may be combined.

The average particle size of the inorganic fillers and the average dispersion particle size of the organic fillers are preferably large in view of ease of mixing with the thermoplastic resin. Further, the average particle size of the inorganic fillers and the average dispersion particle size of the organic fillers are preferably small in view of reducing troubles such as sheet break in stretching and strength reduction of the surface layer in the case of improving the opacity and the printability by forming pores inside the sheet by stretching. Specifically, the average particle size of the inorganic fillers and the average dispersion particle size of the organic fillers are preferably 0.01 µm or more, more preferably 0.1 µm or more, further preferably 0.5 µm or more. Further, the average particle size of the inorganic fillers and the average dispersion particle size of the organic fillers are preferably 30 μm or less, more preferably 20 μm or less, further preferably 15 μm or less.

The average particle size of the inorganic fillers can be measured using a particle size analyzer, for example, a laser diffraction particle size analyzer (Microtrac, available from NIKKISO CO., LTD) from a particle size at 50% in a cumulative measurement (cumulative 50% particle size). Further, the average dispersion particle size of the organic fillers can be determined by observing a cut surface of the thermoplastic resin film using an electron microscope and taking an average in measurement of the maximum diameter of at least 10 particles as an average dispersion particle size when dispersed in the thermoplastic resin by melt-kneading and dispersion.

The content of the fillers in the thermoplastic resin film is preferably 1 mass % or more, more preferably 3 mass % or more, further preferably 5 mass % or more, for ease of imparting opacity, etc., to the thermoplastic resin film.

In view of imparting rigidity to the thermoplastic resin film, thereby improving the handling properties of the recording paper, the content of the fillers in the thermoplastic resin film is preferably 45 mass % or less, more preferably 40 mass % or less, further preferably 35 mass % or less.

(Other Components)

In the present invention, the thermoplastic resin film can optionally contain known additives, as required. Examples of the additives include known aids such as antioxidants, light stabilizers, ultraviolet absorbers, crystal nucleating agents, plasticizers, filler dispersants, slip agents such as fatty acid amide, anti-blocking agents, dyes, pigments, mold release agents, and flame retardants. In particular, in the case where the recording paper requires durability as in the case of a poster paper used outdoor, antioxidants, light stabilizers, and the like are preferably contained.

Examples of the antioxidants include steric hindrance phenolic antioxidants, phosphorus antioxidants, and amine antioxidants.

Examples of the light stabilizers include steric hindrance amine light stabilizers, benzotriazole light stabilizers, and benzophenone light stabilizers.

The content of the antioxidants and the light stabilizers to be used is preferably within the range of 0.001 to 1 mass % with respect to the mass of the substrate. Further, the content may be adjusted within a range that does not inhibits the adhesion between the substrate and the resin coating, which will be described below.

In the case of using a polyolefin resin as the thermoplastic resin, the transparency of the substrate can be enhanced by containing a crystal nucleating agent.

Examples of the crystal nucleating agent include sorbitol nucleating agents, phosphoric acid ester metal salt nucleating agents, amide nucleating agents, aromatic metal salt nucleating agents, and talc.

The content of the crystal nucleating agents is preferably 0.01 to 1 mass %, more preferably 0.05 to 0.5 mass %, further preferably 0.1 to 0.3 mass %, with respect to the mass of the substrate.

In the case of using a polyester resin as the thermoplastic resin, the resin can be plasticized using a plasticizer. Examples of the plasticizer include carboxylic acid esters such as phthalate and adipate; and triacetins.

The substrate may have a single-layer structure but preferably has a multilayer structure, further preferably has a multilayer structure with specific properties imparted to each layer. For example, the thermoplastic resin film may have a three-layer structure of surface layer/base layer/surface layer, and the rigidity, opacity, lightweight properties, and the like suitable for the recording paper can be imparted to the base layer. Here, the two surface layers may have the same properties or different properties. For example, the recording paper suitable as a label paper can be obtained by configuring one surface layer to be a layer suitable for forming the resin coating of the present invention and the other surface layer to be a layer suitable for forming a pressure-sensitive adhesive layer. Further, curling of the substrate can be prevented or curling of the recording paper can also be controlled to within a specific range by appropriately designing the composition and the thickness of one surface layer and the other surface layer. Further, providing a solid printing layer or a pigment-containing layer as a hiding layer on the inner side of the surface layer enables the visibility in duplex printing without printing on the other surface seen through as viewed from one side to be improved and the recording paper suitable as poster paper or the like to be obtained.

The thickness of the substrate is preferably 30 μm or more, more preferably 50 μm or more, for ease of achieving sufficient mechanical strength for use as large poster paper or the like to be posted outside. Further, the thickness of the substrate is preferably 500 μm or less, more preferably 300 μm or less, for reducing the weight of the recording paper and ease of improving the handling properties.

(Porosity)

In the case where the thermoplastic resin film has pores therein, the porosity representing the proportion of the pores in the film is preferably 10% or more, more preferably 12% or more, further preferably 15% or more, particularly preferably 20% or more, for achieving opacity. For maintaining the mechanical strength, the porosity is preferably 45% or less, more preferably 44% or less, further preferably 42% or less, particularly preferably 40% or less.

The porosity can be measured by determining an area percentage occupied by pores in a certain region of a cross section of the substrate observed using an electron microscope. Specifically, any part of the substrate is cut out and embedded into an epoxy resin, followed by solidification, and the resin is thereafter cut using a microtome perpendicularly to the plane direction of the substrate and attached to an observation table so that the cut surface serves as an observation surface. Gold, gold-palladium, or the like is vapor-deposited onto the observation surface, and the pores are observed at any magnification (for example, a magnification of 500 times to 3000 times) at which observation is easy using an electron microscope, to acquire the region observed as image data. The image data obtained is subjected to image processing using an image analyzer, and the area percentage (%) of the porous part can be determined as a porosity (%). In this case, the measured values at any 10 or more sites in the observation can be averaged and taken as a porosity.

(Method for Producing Substrate)

A thermoplastic resin film that is the substrate can be generally obtained by mixing the aforementioned thermoplastic resin with other components to be contained in the thermoplastic resin film, followed by forming. The method for forming the thermoplastic resin film that is the substrate is not specifically limited, and various known forming methods can be used individually or in combination for production.

The thermoplastic resin film can be formed into a film, for example, by cast molding of extruding a molten resin into a sheet using a single-layer or multilayer T die, I die, or the like connected to a screw extruder, calender molding, roll forming, inflation molding, or the like. The thermoplastic resin film may be formed by cast molding or calender molding a mixture of the thermoplastic resin and an organic solvent or oil, followed by removal of the solvent or oil.

Examples of a method for forming the thermoplastic resin film with a multilayer structure include a multilayer die method using a feed block or a multi-manifold, and an extrusion lamination method using a plurality of dies, and these methods can be combined.

The thermoplastic resin film may be a non-stretched film or a stretched film.

Examples of a stretching method include a longitudinal stretching method using a difference in peripheral speed within a roll group, a transverse stretching method using a tenter oven, a sequential biaxial stretching method combining the aforementioned methods, a rolling method, a simultaneous biaxial stretching method by combining a tenter oven and a pantograph, and a simultaneous biaxial stretching by combining a tenter oven and a linear motor. Further, a simultaneous biaxial stretching (inflation molding) method of extruding a molten resin using a circular die connected to a screw extruder into a tube, followed by air inflation can also be used.

In the case where the thermoplastic resin film has a multilayer structure, at least one layer thereof is preferably stretched. In the case of stretching a plurality of layers, the layers may be individually stretched before lamination, or the layers may be collectively stretched after lamination. Further, the stretched layers may be stretched again after lamination.

In the case where the thermoplastic resin used as the substrate is an amorphous resin, the stretching temperature during stretching is preferably within the range of the glass transition temperature of the thermoplastic resin or higher. Further, in the case where the thermoplastic resin is a crystalline resin, the stretching temperature is preferably a temperature within the range of the glass transition temperature of the amorphous part of the thermoplastic resin or higher and the melting point of the crystalline part of the thermoplastic resin or lower, specifically, lower than the melting point of the thermoplastic resin by 2 to 60° C.

The stretching speed of the thermoplastic resin film is not specifically limited but is preferably within the range of 20 to 350 m/minute for stable stretch forming.

Further, the stretch ratio for stretching the thermoplastic resin film can also be appropriately determined in consideration of characteristics or the like of the thermoplastic resin to be used. For example, in the case of stretching a thermoplastic resin film containing a homopolymer of propylene or a copolymer thereof in one direction, the lower limit of the stretch ratio is generally about 1.2 times, preferably 2 times, and the upper limit thereof is 12 times, preferably 10 times. Meanwhile, in the case of biaxial stretching, the lower limit of the stretch ratio is generally 1.5 times, preferably 10 times, and the upper limit thereof is 60 times, preferably 50 times, in terms of the area stretch ratio.

Further, in the case of stretching a thermoplastic resin film containing a polyester resin in one direction, the upper limit of the stretch ratio is generally 1.2 times, preferably 2 times, and the lower limit thereof is 10 times, preferably 5 times. In the case of biaxial stretching, the lower limit of the stretch ratio is generally 1.5 times, preferably 4 times, and the upper limit thereof is 20 times, preferably 12 times, in terms of the area stretch ratio.

A desired porosity is achieved, and the opacity is easily improved when the stretch ratio falls within the aforementioned ranges. Further, there is a tendency that the thermoplastic resin film is less likely to break, and stable stretch forming can be achieved.

(Surface Treatment)

For enhancing the adhesion to the resin coating, the thermoplastic resin film is preferably surface-treated so that the surface is activated.

Examples of the surface treatment include corona discharge treatment, frame treatment, plasma treatment, glow discharge treatment, and ozone treatment, and these treatments can be combined. Among these, corona discharge treatment or frame treatment is preferable, and corona treatment is more preferable.

The amount of discharge when performing the corona discharge treatment is preferably 600 $J/m^2$ (10 W·minute/$m^2$) or more, more preferably 1,200 $J/m^2$ (20 W·minute/$m^2$) or more. Further, the amount of discharge is preferably 12,000 $J/m^2$ (200 W·minute/$m^2$) or less, more preferably 10,800 $J/m^2$ (180 W·minute/$m^2$) or less. The amount of discharge when performing the frame treatment is preferably 8,000 $J/m^2$ or more, more preferably 20,000 $J/m^2$ or more. Further, the amount of discharge is preferably 200,000 $J/m^2$ or less, more preferably 100,000 $J/m^2$ or less.

(Resin Coating)

The resin coating according to the present invention contains a resin that is a reaction product of a cationic water-soluble polymer and a silane coupling agent (which may be hereinafter referred to as "silane coupling agent according to the present invention") and is free from thermoplastic resin particles. The resin coating according to the present invention is generally a film on which characters, images, and the like can be recorded by printing, writing tools, and the like.

(Method for Producing Resin Coating)

The resin coating according to the present invention can be formed by applying an aqueous solution containing a cationic water-soluble polymer and a silane coupling agent and being free from thermoplastic resin particles (which will be hereinafter referred to as "coating solution for forming a resin coating according to the present invention") onto at least one side of a substrate composed of a thermoplastic resin film, followed by drying. Here, the reaction rate between the cationic water-soluble polymer and the silane coupling agent is not necessarily 100%. That is, the resin coating according to the present invention may contain an unreacted cationic water-soluble polymer and an unreacted silane coupling agent other than the resin that is the reaction product (product produced by the reaction). The coating solution for forming a resin coating according to the present invention can be obtained by mixing the cationic water-soluble polymer, the silane coupling agent, and an aqueous solvent, followed by stirring. The coating solution for forming a resin coating according to the present invention may be obtained by mixing an aqueous solution of the cationic water-soluble polymer and an aqueous solution of the silane coupling agent.

The cationic water-soluble polymer (unreacted component), the silane coupling agent (unreacted component), and the reaction product of the cationic water-soluble polymer and the silane coupling agent in the resin coating can be investigated by time-of-flight secondary ion mass spectrometry (TOF-SIMS).

The resin coating containing the resin that is the reaction product is free from emulsion-derived olefin copolymer particles and therefore has fewer asperities on the surface, as compared with a resin coating formed by applying an olefin copolymer emulsion. Therefore, the recording paper having excellent appearance with high gloss and high transparency can be obtained. Since separation of the resin coating is less likely to occur, fluffing is also less likely to occur. Further, the resin coating can achieve sufficient adhesion to thermoplastic resins composed of homopolymers such as homopolypropylene, which generally have low adhesion to other resins, and therefore can enhance the adhesion to the substrate, regardless of the type of thermoplastic resin used for the substrate. Further, the resin coating according to the present invention can achieve sufficiently high adhesion, particularly, water resistant adhesion to not only ink used in common printing systems such as the offset printing system and the flexographic printing system but also liquid toner used in the wet electrophotographic printing system. Accordingly, recording paper with printability in various printing systems including the wet electrophotographic printing system can be provided, and printings with high water resistance and less ink or toner dropping can be provided by using such recording paper.

(Cationic Water-Soluble Polymer)

In the resin coating according to the present invention, the cationic water-soluble polymer is contained as a resin that is a reaction product with a silane coupling agent. However, as described above, the resin coating according to the present invention may contain an unreacted cationic water-soluble polymer.

It is inferred that the resin coating is capable of chemical adhesion (specifically, adhesion by ion binding) and dispersion adhesion (specifically, adhesion by van der Waals force) to ink or toner due to the polar groups of the cationic water-soluble polymer, thereby improving the transferability and the adhesion of ink or toner to the resin coating according to the present invention.

The cationic water-soluble polymer may have a water solubility to an extent such that an aqueous medium containing the cationic water-soluble polymer is in the form of a solution when preparing the coating solution for forming a resin coating according to the present invention.

Examples of the cationic water-soluble polymer that can be used include (meth)acrylic polymers or ethyleneimine polymers having an amino group or an ammonium salt structure, water-soluble polymers having a phosphonium salt structure, and vinyl polymers obtained by cationizing water-soluble polymers such as polyvinylpyrrolidone and polyvinyl alcohol by modification. One of these can be used singly or two or more of these can be used in combination. Among these, (meth)acrylic polymers or ethyleneimine polymers having an amino group or an ammonium salt structure are preferable in view of the transferability and the adhesion of ink or toner to the resin coating in the present invention.

The (meth)acrylic polymers or the ethyleneimine polymers having an amino group or an ammonium salt structure preferably has a primary to tertiary amino group or a primary to tertiary ammonium salt structure, more preferably a secondary to tertiary amino group or a secondary to tertiary ammonium salt structure, further preferably a tertiary amino group or a tertiary ammonium salt structure, in view of the safety. Further, for obtaining a resin with high degree of crosslinking by the reaction with the silane coupling agent and achieving high adhesion of ink or toner to the resin coating, a primary to tertiary amino group or a primary to tertiary ammonium salt structure is preferable, a primary to secondary amino group or a primary to secondary ammonium salt structure is more preferable, and a primary amino group or a primary ammonium salt structure is further preferable.

Among these, ethyleneimine polymers are preferable because of their high affinity to ink or toner used in various printing systems, particularly, ultraviolet curable ink used in the flexographic printing system, thereby improving the adhesion between the resin coating and ink.

Examples of the ethyleneimine polymers include polyethyleneimine, poly(ethyleneimine-urea), an ethyleneimine adduct of polyamine polyamide, alkyl-modified products, cycloalkyl-modified products, aryl-modified products, allyl-modified products, aralkyl-modified products, benzyl-modified products, cyclopentyl-modified products, cyclic aliphatic hydrocarbon-modified products, and glycidol-modified products of these, and hydroxides of these. Examples of modifiers for obtaining such modified products include methyl chloride, methyl bromide, n-butyl chloride, lauryl chloride, stearyl iodide, oleyl chloride, cyclohexyl chloride, benzyl chloride, allyl chloride, and cyclopentyl chloride.

Among these, ethyleneimine polymers represented by Formula (I) below are preferable for improving the transferability and the adhesion of ink or toner, particularly, ultraviolet curable ink used for printing.

[Formula 1]

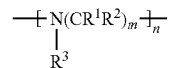

Formula (1)

wherein $R^1$ and $R^2$ each independently represent a hydrogen atom; a linear or branched alkyl group having 1 to 12 carbon atoms; or an alkyl group or an aryl group having an alicyclic structure and 6 to 12 carbon atoms; $R^3$ represents a hydrogen atom; an alkyl group or an allyl group having 1 to 18 carbon atoms and optionally having a hydroxy group; or an alkyl group or an aryl group having 6 to 12 carbon atoms and an alicyclic structure and optionally having a hydroxy group; m represents an integer of 2 to 6; and n represents an integer of 20 to 3000.

As the (meth)acrylic polymers or ethyleneimine polymers having an amino group or an ammonium salt structure, commercially available products can also be used.

Examples of the commercially available products of the (meth)acrylic polymers having an amino group or an ammonium salt structure include POLYMENT (available from NIPPON SHOKUBAI CO., LTD).

Further, examples of the commercially available products of the ethyleneimine polymers include EPOMIN (available from NIPPON SHOKUBAI CO., LTD.) and Polymin SK (available from BASF SE).

The lower limit of the weight-average molecular weight of the (meth)acrylic polymers or the ethyleneimine polymers having an amino group or an ammonium salt structure is preferably 10,000, more preferably 20,000, for improving the adhesion to the substrate and the adhesion to ink or the like. Meanwhile, the upper limit of the weight-average molecular weight thereof is preferably 1,000,000, more preferably 500,000.

The weight-average molecular weight and the number-average molecular weight of the resin can be determined by calculating the values measured by GPC (Gel Permeation Chromatography) in terms of polystyrene.

The coating solution for forming a resin coating according to the present invention may contain polymers other than the cationic water-soluble polymer within a range that does not considerably impair the expression of the excellent effects of the resin coating according to the present invention.

(Silane Coupling Agent)

In the resin coating according to the present invention, the silane coupling agent is contained as a resin that is a reaction product with the cationic water-soluble polymer. However, as described above, the resin coating according to the present invention may contain an unreacted silane coupling agent.

It is inferred that the silane coupling agent according to the present invention contributes to the expression of the function to enhance the adhesion between the substrate composed of the thermoplastic resin film and the resin coating.

Specifically, it is inferred that, since the silane coupling agent has a functional group having high reactivity with organic materials, the functional group enhances the adhesion to the substrate through crosslinking reaction between the thermoplastic resin of the substrate and the cationic water-soluble polymer and prevents penetration of moisture between the substrate and the resin coating. It is inferred that this enhances the scratch resistance by suppressing peeling of the resin coating and separation of ink or toner from printings. Further, it is inferred that the silane coupling agent causes crosslinking reaction within the cationic water-soluble polymer to form a mesh structure, and the mesh structure enhances the transferability and the adhesion of ink or toner. Further, it is inferred that the silane coupling agent improves the water resistance by crosslinking with the cationic water-soluble polymer and further increasing the molecular weight of hydrophilic components (polar resin components) of the cationic water-soluble polymer.

As the silane coupling agent, a silane coupling agent having a group that reacts with the cationic water-soluble polymer, for example, various functional groups such as a silanol group can be used. The group that reacts with the cationic water-soluble polymer refers to a group that forms a bond by reacting with an atom or an atomic group contained in the cationic water-soluble polymer. The bond formed by the reaction may be any of a covalent bond, an ionic bond, a hydrogen bond, and the like and is not particularly limited.

Specifically, a silane coupling agent having an alkoxysilyl group or a silanol group formed by hydrolysis of the alkoxysilyl group together with at least one functional group other than the silanol group such as an epoxy group, a vinyl group, a (meth)acrylic group, an amino group, an ureide group, a mercapto group, an isocyanate group in the molecule can be used.

It is inferred that, in the silane coupling agent, the functional group other than the silanol group undergoes a condensation reaction with a (meth)acrylic acid residue, a maleic anhydride residue, or the like in the (meth)acrylic polymers having an amino group or an ammonium salt structure, or the amino group or the like in the ethyleneimine polymers, while the silanol group undergoes a condensation reaction with the thermoplastic resin of the substrate, thereby causing the crosslinking reaction.

Alternatively, it is inferred that, in the silane coupling agent, the functional group other than the silanol group binds to the thermoplastic resin of the substrate with high affinity, while the silanol group undergoes a condensation reaction with a (meth)acrylic acid residue, a maleic anhydride residue, or the like in the (meth)acrylic polymers having an amino group or an ammonium salt structure, or the amino group in the ethyleneimine polymers, thereby causing the crosslinking reaction.

The content of the alkoxysilyl group or the silanol group formed by hydrolysis of the alkoxysilyl group in the silane coupling agent is preferably 25 to 75%, more preferably 50 to 75%, for allowing firm adhesion between the substrate and the resin coating and firm adhesion between the resin coating and ink or toner. Meanwhile, the content of the reactive functional group other than the alkoxysilyl group or the silanol group formed by hydrolysis of the alkoxysilyl group in the silane coupling agent is preferably 25 to 75%, more preferably 25 to 50%.

Specific examples of the silane coupling agent that can be used include epoxy silane coupling agents, vinyl silane coupling agents, (meth)acrylic silane coupling agents, amino silane coupling agents, ureide silane coupling agents, mercapto silane coupling agents, and isocyanate silane coupling agents.

Examples of the epoxy silane coupling agents include 3-glycidoxypropyltrimethoxysilane, 3-glycidoxypropylmethyldimethoxysilane, 3-glycidoxypropylmethyldiethoxysilane, 3-glycidoxypropyltriethoxysilane, and 2-(3,4-epoxycyclohexyl)ethyltrimethoxysilane. Among these, 3-glycidoxypropyltrimethoxysilane is preferable in view of the adhesion to ink or toner.

Examples of the vinyl silane coupling agents include vinyltrimethoxysilane and vinyltriethoxysilane.

Examples of the (meth)acrylic silane coupling agents include 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane.

Examples of the amino silane coupling agents include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, and N-(vinylbenzyl)-2-aminoethyl-3-aminopropyltrimethoxysilane.

Examples of the ureide silane coupling agents include 3-ureidopropyltriethoxysilane.

Examples of the mercapto silane coupling agents include 3-mercaptopropylmethyldimethoxysilane and 3-mercaptopropyltrimethoxysilane.

Examples of the isocyanate silane coupling agents include 3-isocyanate propyltriethoxysilane.

One of these silane coupling agents can be used singly, or two or more of these can be used in combination.

As commercially available products of the silane coupling agent, KBM-303, KBM-402, KBM-403, KBE-402, KBE-403, KBM-1003, KBE-1003, KBM-502, KBM-503, KBE-502, KBE-503, KBM-5103, KBM-602, KBM-603, KBM-903, KBE-903, KBE-9103, KBM-573, KBM-575, KBE-585, KBM-802, KBM-803, and KBE-9007 (all are product names), available from Shin-Etsu Chemical Co., Ltd.; Z-6043, Z-6040, Z-6519, Z-6300, Z-6030, Z-6011, Z-6094, and Z-6062 (all are product names) available from Dow Corning Toray Co., Ltd., and the like can be used.

Among these, the epoxy silane coupling agents, the amino silane coupling agents, the mercapto silane coupling agents, or the isocyanate silane coupling agents are preferable, the epoxy silane coupling agents or the amino silane coupling agents are more preferable, and the epoxy silane coupling agents are further preferable, in view of the adhesion to ink or toner.

The epoxy silane coupling agents, the ureide silane coupling agents, or the isocyanate silane coupling agents are preferable, and the epoxy silane coupling agents are more preferable, for ease of the crosslinking reaction with the primary to tertiary amino group contained in the ethylene imine polymers.

In the case of using a polyolefin resin as the thermoplastic resin of the substrate, the vinyl silane coupling agents or the (meth)acrylic silane coupling agents are preferable in view of the adaptability to the thermoplastic resin film. In the case of using a polyester resin as the thermoplastic resin, the epoxy silane coupling agents or the amino silane coupling agents are preferably used.

Further, in the case where metal oxide particles such as inorganic fillers are present on the surface of the substrate, the amino silane coupling agents, the ureide silane coupling agents, or the mercapto silane coupling agents are preferably used, for enhancing the adhesion to the substrate by strongly binding to the particles.

It is known that the hydrolysis rate of the silane coupling agent can be controlled depending on the type of alkoxysilyl group. Using such a property, deterioration of the coating solution for forming a resin coating due to self-condensation of the silane coupling agent can be suppressed, and the time transient stability can be enhanced. For achieving high solubility in water, ease of preparation of the coating solution for forming a resin coating according to the present invention, and high time transient stability, the epoxy silane coupling agents are preferable as the silane coupling agent. Among these, 3-glycidoxypropyltrimethoxysilane is preferable.

In the coating solution for forming a resin coating according to the present invention, the alkoxysilane group in the molecule of the silane coupling agent transforms into the silanol group by hydrolysis, and it is inferred that the silanol group undergoes chemical bonding such as hydrogen bonding with the functional group such as a hydroxy group and a carboxy group on the surface-treated thermoplastic resin film, thereby improving the adhesion between the substrate and the resin coating. Further, it is inferred that the condensation reaction within the silanol group improves the cohesion of the resin coating itself, thereby improving the physical strength of the resin coating itself.

The amount of the cationic water-soluble polymer and the silane coupling agent contained in the coating solution for forming a resin coating according to the present invention may be an amount that allows the coupling reaction between the cationic water-soluble polymer and the silane coupling agent to proceed, and it is preferable that the amount of unreacted components in either one be small. In particular, for achieving excellent adhesion of the resin coating according to the present invention to ink or toner, the amount of the unreacted silane coupling agent is preferably small. Further, for achieving excellent water resistance of the resin coating according to the present invention, the amount of the unreacted cationic water-soluble polymer is preferably small. From these points, the coating solution for forming a resin coating according to the present invention preferably contains the silane coupling agent in an amount of 15 to 35 parts by mass, more preferably 15 to 30 parts by mass, further preferably 17 to 25 parts by mass, with respect to 100 parts by mass of the cationic water-soluble polymer. That is, the content of the silane coupling agent component (unreacted part and reacted part) in the resin coating according to the present invention is preferably 15 to 35 mass %, more preferably 15 to 30 mass %, further preferably 17 to 25 mass %, based on the cationic water-soluble polymer component in the resin coating. Within such a range, the recording paper of the present invention when used in the wet electrophotographic printing system using liquid toner has sufficient adhesion to the toner, and printings with high water resistance and less toner dropping can be achieved.

The coating solution for forming a resin coating according to the present invention can contain other aid components such as antistatic agents, crosslinking accelerators, anti-blocking agents, pH adjusters, and defoamers, as required. That is, the resin coating according to the present invention may contain other aid components such as antistatic agents, crosslinking accelerators, anti-blocking agents, pH adjusters, and defoamers, as required.

(Antistatic Agent)

The resin coating according to the present invention preferably contains an antistatic agent, for preventing dust deposition due to electrification and conveyance failure during printing and improving the handling properties of the recording paper.

Among antistatic agents, polymeric antistatic agents are preferable for reducing surface contamination due to bleeding out.

The polymeric antistatic agents are not specifically limited, and cationic, anionic, amphoteric, or nonionic antistatic agents can be used. One of these can be used singly, or two or more of these can be used in combination.

Examples of the cationic antistatic agents can include an antistatic agent having an ammonium salt structure, a phosphonium salt structure, or the like. Examples of the anionic antistatic agents can include an antistatic agent having a structure of sulfonate, phosphate, carboxylate, or the like of alkali metal salts (such as lithium salt, sodium salt, and potassium salt). Examples of the anionic antistatic agents may include an antistatic agent having a structure of acrylate, methacrylate, (anhydrous) maleate, or the like of alkali metal salts in the molecular structure.

Examples of the amphoteric antistatic agents can include an antistatic agent having the structures of both a cationic antistatic agent and an anionic antistatic agent in the same molecule. Examples of the amphoteric antistatic agents include betaine-type antistatic agents. Examples of the nonionic antistatic agents can include an ethylene oxide polymer having an alkylene oxide structure and a polymer having an ethylene oxide polymer component in the molecular chain. Examples of other antistatic agents include a polymeric antistatic agent having boron in the molecular structure.

Among these, cationic antistatic agents are preferable, nitrogen-containing polymeric antistatic agents are more preferable, an antistatic agent having an ammonium salt structure is further preferable, an acrylic resin having a tertiary or quaternary ammonium salt structure is particularly preferable, and an acrylic resin having a quaternary ammonium salt structure is most preferable, as the polymeric antistatic agents.

As the polymeric antistatic agents, commercially available products such as SAFTOMER ST-1000, ST-1100, and ST-3200 (product names) available from Mitsubishi Chemical Corporation can be used.

As the polymeric antistatic agents, compounds that react with the silane coupling agent may be used, and compounds that do not react therewith may be used. However, in view of ease of expression of the antistatic performance, compounds that do not react with the silane coupling agent are preferable.

The amount of the antistatic agent contained in the coating solution for forming a resin coating according to the present invention is preferably 0.01 parts by mass or more, more preferably 1 part by mass or more, further preferably 2 parts by mass or more, with respect to 100 parts by mass of the cationic water-soluble polymer, for preventing electrification. Further, the amount of the antistatic agent contained in the coating solution for forming a resin coating according to the present invention is preferably 45 parts by mass or less, more preferably 40 parts by mass or less, further preferably 35 parts by mass or less, with respect to 100 parts by mass of the cationic water-soluble polymer, in view of the water resistance of the resin coating according to the present invention.

(Crosslinking Accelerator)

Examples of the crosslinking accelerators include phosphoric acid, sulfuric acid, citric acid, and succinic acid.

(Anti-Blocking Agent)

Examples of the anti-blocking agents include acrylic polymer beads of silica, light calcium carbonate, an alkyl acrylate copolymer, or the like.

For achieving sufficient printability, the thickness of the resin coating is preferably 0.1 µm or more, more preferably 0.25 µm or more, further preferably 0.3 µm or more. Further, for making the texture closer to recording paper made of pulp, the thickness of the resin coating is preferably 5 µm or less, more preferably 3 µm or less, further preferably 1.5 µm or less.

(Thermoplastic Resin Particles)

As described above, the resin coating according to the present invention is free from thermoplastic resin particles. The thermoplastic resin particles mean particles dispersed in a dispersion medium within the coating solution for forming a resin coating and derived from an emulsion of a thermoplastic resin such as an olefin copolymer.

The uniformity on the surface of the resin coating is enhanced by not containing the thermoplastic resin particles, thereby allowing recording paper having excellent appearance such as gloss and transparency to be obtained. Further, the adhesion to liquid toner in the wet electrophotographic printing system using toner, particularly, liquid toner is improved, and the adhesion to the substrate is also improved, even when the substrate is homopolypropylene.

The configuration of the resin coating according to the present invention that is free from thermoplastic resin particles and the uniformity on the surface of the resin coating can be investigated by observation using a scanning electron microscope or the like.

As disclosed in International Publication No. 2014/092142, the olefin copolymer emulsion is an emulsion obtained by dispersing or emulsifying an olefin copolymer in an aqueous dispersion medium into particulate form. In the emulsion, a nonionic or cationic surfactant, a nonionic or cationic water-soluble polymer, or the like may be used as a dispersant.

Examples of the olefin copolymer dispersed or emulsified in the emulsion include an olefin copolymer having good emulsifiability and containing a constituent unit having a carboxy group or a salt thereof as a copolymer component. Representative examples of such a copolymer can include a copolymer of an olefin monomer with an unsaturated carboxylic acid or an anhydride thereof, and a salt thereof. Specific examples include an ethylene-(meth)acrylic acid copolymer, an ethylene-(meth)acrylate copolymer, an alkali (earth) metal salt of an ethylene-(meth)acrylic acid copolymer, an ethylene-(meth)acrylate-maleic anhydride copolymer, a (meth)acrylic acid-grafted polyethylene, an ethylene-vinyl acetate copolymer, a maleic anhydride-grafted polyethylene, a maleic anhydride-grafted ethylene-vinyl acetate copolymer, a maleic anhydride-grafted (meth)acrylate-ethylene copolymer, a maleic anhydride-grafted polypropylene, a maleic anhydride-grafted ethylene-propylene copolymer, a maleic anhydride-grafted ethylene-propylene-butene copolymer, a maleic anhydride-grafted ethylene-butene copolymer, and a maleic anhydride-grafted propylene-butene copolymer.

The olefin copolymer particles in the emulsion are generally particles with a volume-average particle size of about 0.2 to 3 µm. The volume-average particle size is a volume-average particle size measured using a laser diffraction particle size distribution analyzer (available from SHIMADZU CORPORATION: SALD-2200).

As disclosed in International Publication No. 2014/092142, the adhesion to toner, particularly, liquid toner in the wet electrophotographic printing system becomes more insufficient when the resin coating contains thermoplastic resin particles other than olefin copolymer particles such as acrylic copolymer particles and urethane copolymer particles, than in the case of containing olefin copolymer particles.

(Recording Paper)

As described above, the resin coating according to the present invention is a recordable film. Examples of the way of recording include recording by printing, writing tools, and the like. The recording paper of the present invention can be used as recording paper by having the resin coating according to the present invention.

(Gloss)

The gloss of the surface of the resin coating of the recording paper of the present invention preferably can maintain the surface gloss of the substrate. A 75-degree specular gloss measured according to JIS P 8142:1993 can be used as the gloss.

(Haze)

The haze of the recording paper of the present invention is preferably low, for ease of improving the transparency of the label. Further, the haze is preferably high, for ease of production. Specifically, the lower limit of the haze of the recording paper of the present invention is preferably 1%, further preferably 2%. Meanwhile, the upper limit of the haze is preferably 10%, further preferably 5%. Here, the haze is a value measured using a haze meter according to JIS K7136:2000.

The haze of the recording paper of the present invention can be adjusted by the type of the substrate, the thickness of the substrate, the surface shape of the substrate, the type of the material used for the resin coating, and the thickness of the resin coating.

(Use Applications of Recording Paper)

Since the recording paper of the present invention can be used in various printing methods including offset printing, letter press printing, gravure printing, flexographic printing, and screen printing and is excellent not only in adhesion to ink of printings to be obtained but also in water resistance, weather resistance, and durability, the recording paper is suitable as paper for posters used indoor and outdoor, stickers used indoor and outdoor, container labels for frozen foods, namers (labels showing the usage and note) of industrial products, and the like.

The recording paper of the present invention is also excellent in adhesion to toner for printings to be obtained, particularly, in the wet electrophotographic printing system using liquid toner and is suitable also for applications of small-lot printing and variable information printing. Further, since the recording paper of the present invention is excellent in water resistance of printings themselves and further printings laminated, the recording paper is suitable as paper for menus, photo books, posters, stickers, and the like used indoor and outdoor.

(Method for Producing Recording Paper)

The recording paper of the present invention can be produced by applying the coating solution for forming a resin coating according to the present invention onto at least one side of a substrate composed of a thermoplastic resin film, followed by drying, to form a resin coating on the substrate.

The productivity of the recording paper of the present invention can be improved by roll-to-roll production. Since the thickness of the resin coating can be adjusted by the amount of the coating solution for forming a resin coating according to the present invention to be applied, the desired recording paper can be produced, for example, by reducing the thickness of the resin coating while maintaining the printability.

The coating solution for forming a resin coating according to the present invention can be prepared by dissolving components such as the cationic water-soluble polymer and the silane coupling agent in an aqueous solvent.

The aqueous solvent may be water or may be mainly composed of water and contain a water-soluble organic solvent such as methyl alcohol, ethyl alcohol, isopropylalcohol, acetone, methyl ethyl ketone, ethyl acetate, toluene, and xylenes. To be mainly composed of water means that 50 mass % or more of the entire solvent is water. Use of an aqueous solvent facilitates process management and is preferable also in view of the safety.

The total amount of the cationic water-soluble polymer and the silane coupling agent contained in the coating solution for forming a resin coating according to the present invention is preferably 0.5 mass % or more, more preferably 10 mass % or more, with respect to the total amount of the coating solution for forming a resin coating according to the present invention. Further, the total amount of the cationic water-soluble polymer and the silane coupling agent contained in the coating solution for forming a resin coating according to the present invention is preferably 40 mass % or less, more preferably 25 mass % or less.

The application of the coating solution for forming a resin coating according to the present invention and the drying of the coating layer may be performed in-line together with the formation of the substrate or may be performed off-line.

For applying the coating solution for forming a resin coating, coating devices such as die coaters, bar coaters, roll coaters, lip coaters, gravure coaters, spray coaters, blade coaters, reverse coaters, and air knife coaters can be used.

The amount of the coating solution for forming a resin coating to be applied can be appropriately adjusted in consideration of the thickness of the resin coating after drying and the concentration of the components.

For drying the coating layer, dryers such as hot air blowers and infrared dryers can be used.

It is inferred that drying the coating layer allows a dehydration condensation reaction by the silane coupling agent in the coating layer to proceed, thereby generating a resin that is a reaction product of the silane coupling agent and the cationic water-soluble polymer.

The total amount (solid content) of the cationic water-soluble polymer, the silane coupling agent, and the resin that is a reaction product of the two contained in the resin coating after drying is preferably 0.1 g/m$^2$ or more, more preferably 0.25 g/m$^2$ or more, further preferably 0.3 g/m$^2$ or more, since the adhesion between the resin coating according to the present invention and ink or toner tends to be sufficiently obtained. For improving the productivity in the application step and preventing uneven application and the like, the total amount (solid content) of the cationic water-soluble polymer, the silane coupling agent, and the resin that is a reaction product of the two contained in the resin coating after drying is preferably 5 g/m$^2$ or less, more preferably 3 g/m$^2$ or less, further preferably 1.5 g/m$^2$ or less.

EXAMPLES

Hereinafter, the present invention will be described further specifically by way of examples, but the present invention is not limited to the following examples unless it exceeds the gist thereof. In the examples, the terms such as "part(s)" and "%" are described on the basis of mass, unless otherwise noted.

(Substrate (E1))

A resin composition (a) composed of 67 mass % of a propylene homopolymer (available from Japan Polypropylene Corporation, product name: NOVATEC PP FY-4, MFR (JIS K2710: 1999): 5.0 g/10 minutes), 10 mass % of high-density polyethylene (available from Japan Polypropylene Corporation, product name: NOVATEC HD HJ580N, MFR (JIS K6922-2): 12 g/10 minutes, melting point (JIS K7121): 134° C.), and 23 mass % of calcium carbonate (available from BIHOKU FUNKA KOGYO CO., LTD., product name: Softon 2200, average particle size 1.0 μm (measurement method: air permeation method)) was melt-kneaded at 260° C. using an extruder and was extruded from a die to form a film. After cooling to 50° C., the film was heated again to 140° C. and was stretched 5 times in the longitudinal direction utilizing the difference in peripheral speed within a roll group, to obtain a uniaxially stretched film serving as a base layer.

Meanwhile, a resin composition (b) composed of 54 mass % of a propylene-ethylene-butene random copolymer (available from Japan Polypropylene Corporation, product name: NOVATEC PP FW4B), 45 mass % of calcium carbonate (available from BIHOKU FUNKA KOGYO CO., LTD., product name: Softon 2200), and 1.0 mass % of titanium oxide (available from ISHIHARA SANGYO KAISHA, LTD., product name: CR-60, average particle size: 0.21 μm) was prepared. The resin composition (b) was melt-kneaded at 250° C. using two other extruders and was extruded from dies to form films respectively on both sides of the uniaxially stretched film, followed by lamination, to obtain a laminate (b/a/b) having a three-layer structure of surface layer/base layer/surface layer. The laminate obtained was introduced into a tenter oven, followed by heating at 155° C., and was then stretched 8 times in the transverse direction using a tenter. Subsequently, after heat setting (annealing) at 164° C. and cooling to 55° C., the ear parts were slit, and a thermoplastic resin film with a thickness of 80 μm obtained was used as a substrate (E1). The substrate (E1) had a porosity of 26%.

(Substrate (E2))

A thermoplastic resin film with a thickness of 80 μm was obtained in the same manner as in the substrate (E1) except that the resin composition (b) was changed to a resin composition (c) composed of 51.5 mass % of a propylene homopolymer (available from Japan Polypropylene Corporation, product name: NOVATEC PP MA-3, MFR (JIS K2710: 1999): 11 g/10 minutes), 3.5 mass % of high-density polyethylene (available from Japan Polypropylene Corporation, product name: NOVATEC HD HJ580N, MFR (JIS K6922-2): 12 g/10 minutes, melting point (JIS K7121): 134° C.), 44.5 mass % of calcium carbonate (available from BIHOKU FUNKA KOGYO CO., LTD., product name: Softon 2200), and 0.5 mass % of titanium oxide (available from ISHIHARA SANGYO KAISHA, LTD., product name:

CR-60, average particle size: 0.21 µm) and was used as a substrate (E2). The substrate (E2) had a porosity of 34%.
(Substrate (E3))

A biaxially stretched polyethylene terephthalate film (available from TOYOBO CO., LTD., product name: E5200) with a thickness of 75 µm was used as a substrate (E3).

(Cationic Water-Soluble Polymer (A1) Aqueous Solution)

40 kg of isopropanol (available from Tokuyama Corporation, product name: TOKUSO IPA) was put into a reactor having an internal capacity of 150 L and equipped with a reflux condenser, a nitrogen inlet tube, a stirrer, a thermometer, a dropping funnel, and a heating jacket. Under stirring, 12.6 kg of N,N-dimethylaminoethyl methacrylate (available from Sanyo Chemical Industries, Ltd., product name: methacrylate DMA), 12.6 kg of butyl methacrylate (available from Mitsubishi Rayon Co., Ltd., product name: Acryester B), and 2.8 kg of higher alcohol methacrylate (available from Mitsubishi Rayon Co., Ltd., product name: Acryester SL, mixture of lauryl methacrylate and tridecyl methacrylate) were put therein. After the system was purged with nitrogen, and the internal temperature was raised to 80° C., 0.3 kg of 2,2'-azobisisobutyronitrile (available from Wako Pure Chemical Industries, Ltd., product name: V-60(AIBN)) as a polymerization initiator was added thereto, to initiate polymerization.

The polymerization was performed for 4 hours with the reaction temperature maintained at 80° C., and the copolymer obtained was neutralized with 4.3 kg of glacial acetic acid (available from Wako Pure Chemical Industries, Ltd). The system was purged by adding 48.3 kg of deionized water while distilling off isopropanol from the reactor, and a viscous aqueous solution of a tertiary amino group-containing methacryl polymer (weight-average molecular weight 40,000) (with a concentration of the tertiary amino group-containing methacryl polymer of 35 mass %) was obtained. The aqueous solution obtained was used as a cationic water-soluble polymer (A1) aqueous solution.

(Cationic Water-Soluble Polymer (A2) Aqueous Solution)

A commercially available polyethyleneimine aqueous solution (available from BASF Japan Ltd., product name: Polymin SK) that is a secondary amino group-containing polymer was used as a cationic water-soluble polymer (A2) aqueous solution.

(Silane Coupling Agent (B))

3-Glycidoxypropyltrimethoxysilane (available from Shin-Etsu Chemical Co., Ltd., product name: KBM-403) that is a commercially available silane coupling agent was used as a silane coupling agent (B).

(Polymeric Antistatic Agent (C))

35 parts by mass of dimethylaminoethyl methacrylate, 20 parts by mass of ethyl methacrylate, 20 parts by mass of cyclohexyl methacrylate, 25 parts by mass of stearyl methacrylate, 150 parts by mass of ethyl alcohol, and 1 part by mass of 2,2'-azobisisobutyronitrile were added into a four-necked flask with a stirring device, a reflux condenser, a thermometer, and a nitrogen gas inlet tube attached. After the system was purged with nitrogen, polymerization reaction was performed under a nitrogen stream at a temperature of 80° C. for 6 hours. Subsequently, 70 parts by mass of a 60-mass % ethyl alcohol solution of 3-chloro-2-hydroxypropylammonium chloride was added thereto, followed by further reaction at a temperature of 80° C. for 15 hours. After ethyl alcohol was distilled off while adding water dropwise, an aqueous solution of a quaternary ammonium salt-containing acrylic resin with a concentration of 30 mass % was obtained and used as a polymeric antistatic agent (C).

(Olefin Copolymer Emulsion)

Using a twin-screw extruder (available from THE JAPAN STEEL WORKS, LTD., device name: TEX30HSS), a resin as a raw material was melt-kneading and emulsified by the following procedure to prepare an olefin copolymer emulsion.

Specifically, an ethylene-methacrylic acid-acrylate copolymer (available from Dow-Mitsui Polychemicals Company, Ltd., product name: NUCREL N035C) in the form of pellets as an olefin copolymer was supplied from a hopper to the extruder. Then, the mixture was melted and kneaded under conditions of a screw rotation speed of 230 rpm and a cylinder temperature of 160 to 250° C.

Subsequently, the cationic water-soluble polymer (A1) was continuously supplied from the inlet at the middle part of the cylinder of the extruder to give 5 parts by mass of the cationic water-soluble polymer (A1) with respect to 100 parts by mass of the olefin copolymer, thereby performing emulsification and dispersion of the olefin copolymer. Thereafter, the mixture was extruded from the outlet of the extruder, to obtain a milky aqueous dispersion. The total concentration of the cationic water-soluble polymer (A1) and the olefin copolymer was adjusted to 45 mass % by adding deionized water to the aqueous dispersion, to obtain an olefin copolymer emulsion. The volume-average particle size of the olefin copolymer particles in the emulsion, as measured using a laser diffraction particle size distribution analyzer (available from SHIMADZU CORPORATION, device name: SALD-2000), was 1.0 µm.

(Crosslinking Agent)

An epichlorohydrin adduct of polyamine polyamide (available from Japan PMC Corporation, product name: WS-4082) was used as a crosslinking agent other than the silane coupling agent.

(Crosslinking Accelerator)

A commercially available phosphoric acid (available from Wako Pure Chemical Industries, Ltd.) was used as a crosslinking accelerator.

Example 1

An aqueous solution containing 21 parts by mass (in terms of solid content) of the cationic water-soluble polymer (A2), 21 parts by mass of the silane coupling agent (B), 19 parts by mass of the polymeric antistatic agent (C), and 2 parts by mass of phosphoric acid serving as a crosslinking accelerator with respect to 100 parts by mass (in terms of solid content) of the cationic water-soluble polymer (A1) was prepared as a coating solution for forming a resin coating.

After corona discharge treatment was applied to both sides of the substrate (E1) under conditions of 30 W·minute/m$^2$, the coating solution for forming a resin coating prepared was applied thereto using a roll coater so that the solid content of each surface after drying was 0.025 g/m$^2$. The coating layer was dried in an oven at 60° C. to form a resin coating, thereby obtaining a recording paper of Example 1.

Examples 2 to 5 and Comparative Examples 4 and 5

Recording papers of Examples 2 to 5 and Comparative Examples 4 and 5 were obtained in the same manner as in Example 1 except that the components in the coating solution for forming a resin coating were changed as shown in Table 1 below.

Comparative Example 1

As shown in Table 1, an aqueous solution containing 4 parts by mass of the cationic water-soluble polymer (A2), 5 parts by mass of the silane coupling agent (B), 5 parts by mass of the polymeric antistatic agent (C), and 2 parts by mass of phosphoric acid serving as a crosslinking accelerator with respect to 100 parts by mass of the olefin copolymer emulsion was prepared as a coating solution for forming a resin coating.

Corona discharge treatment was applied to both sides of the substrate (E1) with an intensity of 30 W·minute/m$^2$, and the coating solution for forming a resin coating was applied thereto with a roll coater so that the solid content of each surface after drying was 0.36 g/m$^2$. The coating layer was dried in an oven at 60° C. to form a resin coating, thereby obtaining a recording paper of Comparative Example 1.

Comparative Example 2

A recording paper was obtained in the same manner as in Comparative Example 1 except that the olefin copolymer emulsion was not used, and 4 parts by mass of a crosslinking agent was further used instead of 5 parts by mass of the silane coupling agent (B).

Comparative Example 3

A recording paper was obtained in the same manner as in Comparative Example 1 except for the change to the substrate (E2).

(Evaluation)

The unprinted recording papers prepared were evaluated as follows.

(Glossiness)

The 75-degree specular gloss was measured according to JIS P 8142:1993 for each substrate before the resin coating was formed by applying the coating solution for forming a resin coating and each recording paper after the resin coating was formed. Specifically, a test specimen with dimensions of 100 mm×100 mm was fabricated from each of the substrates and the recording papers. Using a digital variable gloss meter (available from Suga Test Instruments Co., Ltd.), the gloss was measured at three points of the test specimen, and an average of the measured values was determined. For the recording papers, the gloss on the surface provided with the resin coating was measured.

(Uneven Application)

Each recording paper was illuminated using a daytime white fluorescent light at an illuminance of about 500 lx at almost the same angle as the line of sight from the opposite direction of the line of sight, to visually observe the surface of the recording paper. The uneven application was evaluated as follows based on the presence or absence of streaks during application.

Good: No streaks observed
Poor: Streaks observed (Fluffing)

Two pieces of each recording paper were punched out in the form of labels, and the pieces of the recording paper were rubbed against each other, using a Gakushin (Japan Society for the Promotion of Science) type dyeing friction fastness tester (available from Suga Test Instruments Co., Ltd., device name: friction tester Type II), continuously 100 times with a load of 500 g applied. Thereafter, the surface of each recording paper was visually observed, and the presence or absence of fluffing was evaluated as follows.

Good: No fluffing observed
Poor: Fluffing observed (Printability in Wet Electrophotographic Printing System)

TABLE 1

| | | Resin coating | | | | | | | | |
|---|---|---|---|---|---|---|---|---|---|---|
| | | Cationic water-soluble polymer | | Silane coupling agent | Antistatic agent | Olefin copolymer | Crosslinking agent | Crosslinking accelerator | Amount to be applied | Content of (B) with respect to (A) |
| | Substrate | (A1) [Parts by mass] | (A2) [Parts by mass] | (B) [Parts by mass] | (C) [Parts by mass] | emulsion [Parts by mass] | [Parts by mass] | [Parts by mass] | [g/m$^2$] | [Mass %] |
| Example 1 | E1 | 100 | 21 | 21 | 19 | 0 | 0 | 2 | 0.025 | 17 |
| Example 2 | E1 | 100 | 25 | 25 | 31 | 0 | 0 | 2 | 0.025 | 20 |
| Example 3 | E1 | 100 | 25 | 25 | 31 | 0 | 0 | 2 | 0.012 | 20 |
| Example 4 | E1 | 100 | 13 | 25 | 13 | 0 | 0 | 2 | 0.020 | 22 |
| Example 5 | E2 | 100 | 25 | 21 | 19 | 0 | 0 | 2 | 0.025 | 17 |
| Comparative Example 1 | E1 | 0 | 4 | 5 | 5 | 100 | 0 | 2 | 0.360 | 125 |
| Comparative Example 2 | E1 | 0 | 4 | 0 | 5 | 0 | 4 | 0 | 0.020 | 0 |
| Comparative Example 3 | E2 | 0 | 4 | 5 | 5 | 100 | 0 | 2 | 0.360 | 125 |
| Comparative Example 4 | E1 | 100 | 13 | 13 | 13 | 0 | 0 | 2 | 0.020 | 12 |
| Comparative Example 5 | E1 | 100 | 8 | 8 | 13 | 0 | 0 | 1 | 0.018 | 7 |

Using a wet electrophotographic printing machine using liquid toner (available from Hewlett-Packard Japan, Ltd., device name: Indigo7800), the printability of each recording paper was evaluated as follows.

(Toner Transferability)

The recording paper obtained in each of Examples and Comparative Examples was humidified in an environment at a temperature of 23° C. and a relative humidity of 50% for 3 hours. Subsequently, a black solid image with a density of 100% and a black halftone dot pattern with a density of 30% were each printed on one side of the recording paper in the same environment as in humidification using the aforementioned printer. The printer was equipped with multi-color liquid toner (available from Hewlett-Packard Japan, Ltd., product name: HP ElectroInk Light Cyan Q4045A, HP ElectroInk Light Magenta Q4046A, HP ElectroInk Digital Matt 4.0, 3 Cartridges Q4037A, HP ElectroInk Digital Matt 4.0, 9 Cartridges Q4038A). The state of each image on the recording paper after printing was enlarged using a loupe and visually observed, and the toner transferability was evaluated as follows.

Good: Clear image with good toner transferability
Poor: Faint image with low toner transferability
(Toner Adhesion: Dry Conditions)

After a lapse of 2 minutes from printing, the adhesive surface of an adhesive tape (available from NICHIBAN CO., LTD., product name: Cellotape® CT-18) was attached to the printed surface of the recording paper and was closely contacted sufficiently by rubbing it three times with a finger. After the closely contacted adhesive tape was peeled off by hand at a speed of 300 m/min in the direction of 180 degrees, the liquid toner remaining proportion on the recording paper was calculated using a compact general-purpose image analyzer (available from NIRECO CORPORATION, model name: LUZEX-AP). Specifically, the image obtained by capturing the printed surface was binarized, and the area proportion of the liquid toner was calculated as a remaining proportion. From the liquid toner remaining proportion calculated, the adhesion of toner was ranked according to the following criteria. C-rank or higher was regarded acceptable, and D-rank or lower was regarded unacceptable.

A: Liquid toner remaining proportion of 95% or more
B: Liquid toner remaining proportion of 90% or more and less than 95%
C: Liquid toner remaining proportion of 70% or more and less than 90%
D: Liquid toner remaining proportion of 20% or more and less than 70%
E: Liquid toner remaining proportion of less than 20%
(Toner Adhesion (Water Resistant Adhesion): Wet Conditions)

The recording paper after printing was immersed in water at 23° C. for 24 hours. Thereafter, it was taken out of the water, and moisture was lightly wiped off with a waste cloth. The tape peeling test and the evaluation were conducted 5 minutes later in the same manner as in the dry conditions.
(Scratch Resistance: Dry Conditions)

Each recording paper was punched out in the form of a label, and the recording paper was mounted on a Gakushin (Japan Society for the Promotion of Science) type dyeing friction fastness tester (available from Suga Test Instruments Co., Ltd., device name: friction tester Type II), followed by a friction test of rubbing against a white cotton cloth moistened in water 100 times with a load of 500 g. The scratch resistance was evaluated from the toner remaining proportion on the recording paper after the friction test according to the same criteria as in the evaluation of the toner adhesion.
(Scratch Resistance: Wet Conditions)

The recording paper after printing was immersed in water at 23° C. for 24 hours. Thereafter, it was taken out of the water, and moisture was lightly wiped off with a waste cloth. The friction test and the evaluation were performed thereon 5 minutes later in the same manner as in the dry conditions.
(Toner Transferability and Adhesion after Condensation Promotion)

The unprinted recording paper was subjected to condensation promotion of humidification in an environment at a temperature of 0° C. and a relative humidity of 40 RH % for 0.5 hours and further humidification in an environment at a temperature of 40° C. and a relative humidity of 90 RH % for 2 hours. With this process taken as one cycle, 15 cycles were performed. Using the recording paper after the condensation promotion, printing was performed in the same manner as above, and the toner transferability and the adhesion were evaluated.
(Printability in Flexographic Printing System)

Using a flexographic printing tester (available from Akira Seisakusho, device name: RI-III type printability tester), the printability in the flexographic printing system was evaluated as follows.

Using the aforementioned flexographic printing tester, a solid image with a density of 100% was printed onto one side of the recording paper with an ink amount of 1.5 g/m². For the printing, an ultraviolet curable flexographic ink (available from T&K TOKA CO., LTD., product name: UV flexographic CF indigo color) was used.

Using the recording paper after the printing, the printability such as ink transferability, adhesion, and scratch resistance was evaluated in the same manner as in the wet electrophotographic printing system.

Table 2 and Table 3 below show the evaluation results.

TABLE 2

| | Gloss | | | |
| | Before application [°] | After application [°] | Uneven application | Fluffing |
|---|---|---|---|---|
| Example 1 | 20 | 25 | Good | Good |
| Example 2 | 20 | 25 | Good | Good |
| Example 3 | 20 | 25 | Good | Good |
| Example 4 | 20 | 25 | Good | Good |
| Example 5 | 21 | 25 | Good | Good |
| Comparative Example 1 | 20 | 8 | Poor | Poor |
| Comparative Example 2 | 20 | 22 | Good | Good |
| Comparative Example 3 | 21 | 10 | Poor | Poor |
| Comparative Example 4 | 20 | 25 | Good | Good |
| Comparative Example 5 | 20 | 25 | Good | Good |

TABLE 3

| | Wet electrophotographic printing system using liquid toner | | | | | | | Ultraviolet curable flexographic printing system | | | | | | | |
|---|---|---|---|---|---|---|---|---|---|---|---|---|---|---|---|
| | Before condensation promotion | | | | | After condensation promotion | | Before condensation promotion | | | | | After condensation promotion | | |
| | Toner transfer- | Toner adhesion | | Scratch resistance | | Toner transfer- | Toner adhesion | | Ink transfer- | Ink adhesion | | Scratch resistance | | Ink transfer- | Ink adhesion | |
| | ability | Dry | Wet | Dry | Wet | ability | Dry | Wet | ability | Dry | Wet | Dry | Wet | ability | Dry | Wet |
| Example 1 | Good | A | A | A | A | Good | A | A | Good | A | A | A | A | Good | A | A |
| Example 2 | Good | A | B | A | B | Good | A | B | Good | A | B | A | B | Good | A | B |
| Example 3 | Good | A | B | B | B | Good | B | C | Good | A | B | B | B | Good | B | C |
| Example 4 | Good | A | A | C | A | Good | C | A | Good | A | A | C | A | Good | C | A |
| Example 5 | Good | A | B | A | A | Good | A | B | Good | A | A | A | A | Good | A | A |
| Comparative Example 1 | Good | A | A | A | A | Good | A | A | Good | A | A | A | A | Good | A | A |
| Comparative Example 2 | Good | A | E | A | E | Poor | D | D | Good | A | A | A | A | Poor | B | B |
| Comparative Example 3 | Good | B | C | A | A | Good | C | C | Good | C | C | A | A | Good | C | C |
| Comparative Example 4 | Good | A | A | C | A | Good | C | B | Good | A | A | C | A | Good | C | B |
| Comparative Example 5 | Good | A | C | C | C | Good | C | C | Good | A | C | C | C | Good | C | C |

As is obvious from Table 3, the recording paper of Examples 1 to 5 exhibited good printability for all of the toner transferability, the adhesion, and the scratch resistance, even in the case of printing with the wet electrophotographic printing system using liquid toner. For the adhesion, the results were good even in wet conditions, particularly showing high water resistant adhesion. The toner transferability, the adhesion, and the scratch resistance after the condensation promotion were also good, thereby revealing excellent water resistance and excellent time transient stability.

Likewise, the recording paper of Examples 1 to 5 was excellent in ink transferability, adhesion, and scratch resistance also in the case of the ultraviolet curable flexographic ink used in the flexographic printing, which is a conventional printing technique, and it is understood also from good results after the condensation promotion that the water resistance and the time transient stability were good.

Further, the finish after printing turned out to be also good since there was no uneven application in the resin coating of Examples 1 to 5. Further, it can be seen that there was no contamination due to dropping of the surface layer of the resin coating in the printing step and the processing step, since there was no fluffing in the resin coating of Examples 1 to 5.

It is understood that the characteristics of the surface of the substrate could be maintained even after the formation of the resin coating, since the recording paper of Examples 1 to 5 had high transparency of the resin coating, and there was a small difference in gloss between before and after the application.

Meanwhile, in the recording paper of Comparative Examples 1 and 3, the coating solution for forming a resin coating contains the olefin copolymer emulsion, and therefore the gloss decreases due to the influence of the emulsion-derived olefin copolymer particles as compared with that before the application. Streaks were observed after the application, and fluffing was observed when the resin coating was rubbed, probably because the olefin copolymer particles were oriented in the conveyance direction of the recording paper by the roll coater during the application.

FIGS. 2 to 4 respectively show images captured by a scanning electron microscope after vapor deposition of gold on the surface of the substrate before the formation of the recording paper of Comparative Example 1 and the recording paper and the resin coating of Example 1. The images of FIG. 2 and FIG. 4 were captured using a scanning electron microscope (model number: SM-200) available from TOPCON CORPORATION, and the image of FIG. 3 was captured using a scanning electron microscope (model number: JCM-6000) available from JEOL Ltd. The magnification during capture was 3000 times in all cases.

As shown in FIG. 2, it can be seen that the surface of Comparative Example 1 has many microasperities and is fluffed easily. It is considered that these asperities are derived from the olefin copolymer particles. Meanwhile, as shown in FIG. 3, it can be seen that the surface of Example 1 has less asperities and has a surface structure in which fluffing is less likely to occur. When FIG. 3 is compared with FIG. 4 that is a captured image of the substrate, large granules can be observed in both, and therefore these granules are considered to be the filler in the substrate shown in FIG. 4.

When Example 5 is compared with Comparative Example 3, it is understood that the resin coating of Example 5 has better adhesion of toner and ink after the condensation promotion even when using a substrate including a surface layer made of homo-PP (polypropylene) than the resin coating of Comparative Example 3 containing the olefin copolymer particles, thus having higher adhesion to the substrate.

When Example 1 is compared with Comparative Example 2, it is understood that the resin coating of Example 1 has the water resistance and the time transient stability improved as compared with the resin coating combining cationic water-soluble polymer free from crosslinking agents and tertiary amino groups other than the silane coupling agent.

This application claims priority to Japanese Patent Application No. 2017-136039, filed on Jul. 12, 2017 and Japanese Patent Application No. 2017-221688, filed on Nov. 17, 2017, the disclosures of which are incorporated herein by reference in their entireties.

REFERENCE SIGNS LIST

1: Recording paper
11: Substrate
12: Resin coating

INDUSTRIAL APPLICABILITY

Having not only excellent appearance and high adhesion between the substrate and the resin coating but also high adhesion, particularly, high water resistant adhesion to ink or toner in various printing systems, the recording paper of the present invention can be used widely as printing paper, poster paper, label paper, ink jet recording paper, heat-sensitive recording paper, thermal transfer receiving paper, pressure-sensitive transfer recording paper, electrophotographic recording paper, and the like.

The invention claimed is:

1. A recording paper comprising:
a substrate composed of a thermoplastic resin film; and
a resin coating disposed on at least one side of the substrate,
wherein
the resin coating consists of
(a) a resin that is a reaction product of a cationic water-soluble polymer and a silane coupling agent, or
(b) a resin that is a reaction product of a cationic water-soluble polymer and a silane coupling agent, and at least one aid component selected from the group consisting of antistatic agent, crosslinking accelerators, pH adjusters, and defoamers, and
wherein
a content of the silane coupling agent component is 15 to 35 mass % based on a cationic water-soluble polymer component in the resin coating,
the cationic water-soluble polymer comprises a (meth)acrylic polymer or an ethyleneimine polymer,
the cationic water-soluble polymer comprises as the (meth)acrylic polymer or the ethyleneimine polymer:
(i) a first polymer having
a primary or secondary amino group or
a primary or secondary ammonium salt structure, and
(ii) a second polymer having
a tertiary amino group or
a tertiary ammonium salt structure,
said second polymer having neither primary nor secondary amino group nor primary nor secondary ammonium salt structure,
wherein the content of polymeric material having a tertiary amino group or a tertiary ammonium salt structure in the resin film is 100 parts by mass or less based on 113 parts by mass of the cationic water-soluble polymer, and
wherein the (meth)acrylic polymer or the ethyleneimine polymer has a weight-average molecular weight of greater than 20,000 and not greater than 1,000,000 and does not have a quaternary ammonium salt structure, and
the resin coating is free from thermoplastic resin particles.

2. The recording paper according to claim 1, wherein the silane coupling agent is an epoxy silane coupling agent.

3. The recording paper according to claim 1, wherein the thermoplastic resin film is a polyolefin resin film or a polyester resin film.

4. The recording paper according to claim 1, wherein a thickness of the resin coating is 0.1 μm or more and 5 μm or less.

5. The recording paper according to claim 1, wherein the resin coating comprises an antistatic agent,
wherein the antistatic agent
is an acrylic resin having a quaternary ammonium salt structure, and
does not react with the silane coupling agent.

6. The recording paper according to claim 5, wherein a content of the antistatic agent is 0.01 parts by mass or more and 45 parts by mass or less based on a cationic water-soluble polymer component in the resin coating, with respect to 100 parts by mass of the cationic water-soluble polymer.

7. The recording paper according to claim 1, wherein the content of the polymeric material having said primary or secondary group or ammonium salt structure in the resin film is 25 parts by mass or less based on 125 parts by mass of the cationic water-soluble polymer.

* * * * *